US009957141B2

(12) United States Patent
Abel et al.

(10) Patent No.: US 9,957,141 B2
(45) **Date of Patent: *May 1, 2018**

(54) METHOD FOR DETERMINING THE LOAD CAPACITY OF CRANES

(75) Inventors: Peter Abel, Mengen (DE); Helmut Spaeth, Schelklingen (DE)

(73) Assignee: Liebherr-Werk Ehingen GmbH, Ehingen/Donau (DE)

( * ) Notice: Subject to any disclaimer, the term of this patent is extended or adjusted under 35 U.S.C. 154(b) by 872 days.

This patent is subject to a terminal disclaimer.

(21) Appl. No.: 12/797,405

(22) Filed: Jun. 9, 2010

(65) Prior Publication Data

US 2010/0250153 A1 Sep. 30, 2010

Related U.S. Application Data

(63) Continuation of application No. 11/494,263, filed on Jul. 26, 2006.

(30) Foreign Application Priority Data

Jul. 28, 2005 (DE) ........................ 10 2005 035 460

(51) Int. Cl.

| | |
|---|---|
| ***G06F 7/70*** | (2006.01) |
| ***G06F 19/00*** | (2011.01) |
| ***G06G 7/00*** | (2006.01) |
| ***G06G 7/76*** | (2006.01) |
| ***B66C 23/90*** | (2006.01) |

(52) U.S. Cl.
CPC .................................. *B66C 23/905* (2013.01)

(58) Field of Classification Search
CPC .................................................... B66C 23/905
USPC .................................................... 701/50, 124
See application file for complete search history.

(56) References Cited

U.S. PATENT DOCUMENTS

| | | | | |
|---|---|---|---|---|
| 3,638,211 | A * | 1/1972 | Sanchez | B66C 23/905 212/277 |
| 5,160,056 | A | 11/1992 | Yoshimatsu et al. | |
| 5,731,974 | A | 3/1998 | Pietzsch et al. | |
| 6,170,681 | B1 * | 1/2001 | Yoshimatsu | B66C 23/905 212/278 |

(Continued)

FOREIGN PATENT DOCUMENTS

| | | |
|---|---|---|
| DE | 2635974 | 9/1978 |
| DE | 2910057 | 9/1980 |

(Continued)

*Primary Examiner* — Imran Mustafa
(74) *Attorney, Agent, or Firm* — McCoy Russell LLP

(57) ABSTRACT

The present disclosure relates to a method for determining the admissible load capacity of a crane, in which the load capacity is determined in dependence on at least one first and one second parameter and which comprises a first step, in which the load capacity for the value of the first parameter with different values of the second parameter is determined by calculation or by interpolation or extrapolation on the basis of known values of the load capacity with specific values of the first parameter, and which comprises a second step, in which the determination of the load capacity for the second parameter is performed on the basis of the values of the load capacity determined in the first step for different values of the second parameter by calculation or by interpolation or extrapolation.

17 Claims, 1 Drawing Sheet

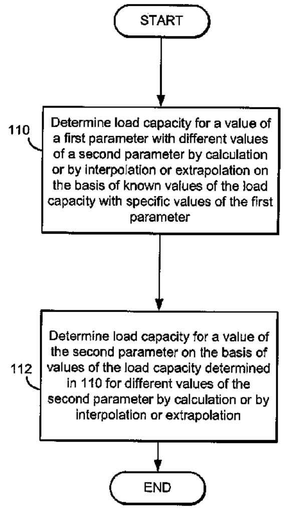

(56) References Cited

U.S. PATENT DOCUMENTS

| | | | | |
|---|---|---|---|---|
| 6,744,372 | B1 * | 6/2004 | Shaw | B66C 13/44<br>212/276 |
| 2007/0027613 | A1 | 2/2007 | Abel et al. | |
| 2007/0034587 | A1 | 2/2007 | Morath | |

FOREIGN PATENT DOCUMENTS

| | | | | |
|---|---|---|---|---|
| DE | 3420596 | | 12/1985 | |
| DE | 19933917 | | 2/2000 | |
| DE | 19931302 | | 1/2001 | |
| DE | 10023418 | | 11/2001 | |
| EP | 0614845 | | 9/1994 | |
| EP | 1153876 | | 11/2001 | |
| EP | 1748021 | | 1/2007 | |
| KR | 20030045483 | A * | 6/2003 | B66C 15/00 |

* cited by examiner

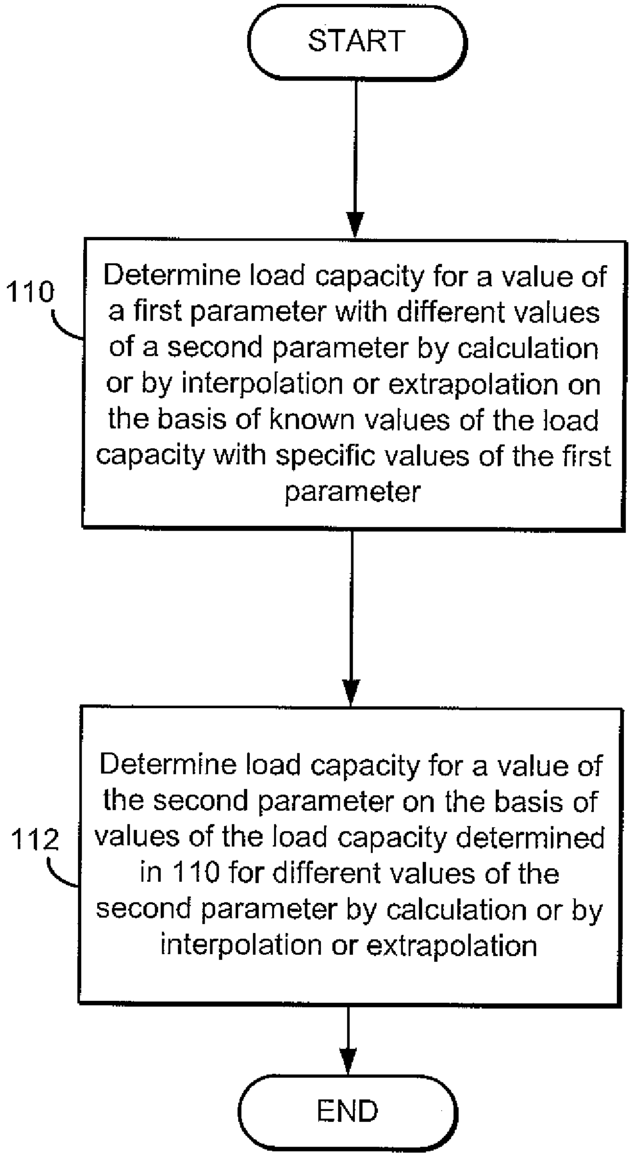
START
110
Determine load capacity for a value of a first parameter with different values of a second parameter by calculation or by interpolation or extrapolation on the basis of known values of the load capacity with specific values of the first parameter
112
Determine load capacity for a value of the second parameter on the basis of values of the load capacity determined in 110 for different values of the second parameter by calculation or by interpolation or extrapolation
END

METHOD FOR DETERMINING THE LOAD CAPACITY OF CRANES

CROSS-REFERENCE TO RELATED APPLICATION

The present application is a continuation of U.S. patent application Ser. No. 11/494,263, filed Jul. 26, 2006, entitled "Method for Determining the Load Capacity of Cranes," which claims priority to German Patent Application Serial No. 10 2005 035 460.2 filed Jul. 28, 2005, entitled "Method for Determining the Load Capacity of Cranes," both of which are hereby incorporated by reference in their entirety for all purposes.

TECHNICAL FIELD

The present disclosure relates to a method for determining the admissible load capacity of a crane.

BACKGROUND AND SUMMARY

The determination of the admissible load capacity of a crane so far has been effected for certain set-up or condition parameters to be specified explicitly. There are known for instance indicated load capacities for certain specified ballast stages of the rotary platform of e.g. 10 t (tons) and 20 t or for certain boom lengths and lengths of outreach. The same is true for other parameters, which influence the admissible load capacity of a crane. The admissible values of the load capacity frequently are indicated in the form of load capacity tables, the values of the load capacity usually being indicated in dependence of two parameters. A disadvantage of this procedure is that a determination of the load capacity for arbitrary parameter values freely selectable within a range of parameters is not possible, which results in the disadvantage that the determination of the load capacity is relatively inaccurate.

Therefore, it is the object underlying the present disclosure to develop a method as mentioned above such that the admissible load capacity of a crane can be determined for arbitrary parameter values.

This object is solved by a method in which the load capacity is determined in dependence on at least one first and one second parameter and that the method comprises a first step, in which the load capacity for the value of the first parameter with different values of the second parameter is determined by calculation or by interpolation or extrapolation on the basis of known values of the load capacity for specific values of the first parameter, and that the method comprises a second step, in which the determination of the load capacity for the value of the second parameter is performed on the basis of the load capacity values determined in the first step for different values of the second parameter by calculation or by interpolation or extrapolation.

If it is desired to determine the load capacity for instance in dependence on the parameters of outreach (21.7 m) and main boom angle (83°), the procedure can be as follows: The determination of the admissible load capacity is for instance effected in that for first and second angles (77°; 87°) of the main boom an interpolation of the load capacity is performed by using two points of support from load capacity values known for the different lengths of outreach. It is conceivable, for instance, to perform an interpolation for an outreach of 21.7 m between the points of support at 20 m and 22 m, for which the load capacity is known. This interpolation is performed for a boom angle of 77° as well as for a boom angle of 87°. If it is then desired to determine the load capacity for a boom angle of 83°, a second step then comprises an interpolation between the load capacity values obtained for the boom angle of 77° and for the boom angle of 87°, i.e. in accordance with this example, the second interpolation step employs the points of support obtained in the first step.

Instead of an interpolation or extrapolation, there can also be performed a calculation of the load capacity values, in order to obtain the points of support.

Particularly advantageously, the specific values of the first parameter, for which the load capacity values are known, are chosen in dependence on the values of the second parameter. With reference to the preceding example this means that in contrast to the preceding example, in which identical points of support were used for both main boom angles, the points of support for the interpolation or extrapolation of the load capacity are chosen in dependence on the angle of the main boom. It is advantageous and conceivable when for a larger main boom angle, i.e. with a main boom positioned steeper, smaller values of the outreach are chosen as points of support than for a smaller main boom angle. It is conceivable, for instance, to choose the points of support with a main boom angle of 77° at 20 m and 22 m and with a main boom angle of 87° at 14 m and 16 m. These are, of course, only exemplary values.

The procedure of choosing the specific values of the first parameter, for which the load capacity values are known, in dependence on the values of the second parameter, is of course not only applicable for the parameters of outreach and main boom angle, but also for other parameters, in particular for parameters which exhibit a dependence on each other.

The interpolation or extrapolation can be performed by assuming a linear relationship or also by taking any other functions as a basis, which represent a dependence of the load capacity on the respective parameter.

In principle it is likewise conceivable to perform the determination of the load capacity by calculation. This requires that a connection described by formulae is known between the load capacity and the parameters which have an influence on the load capacity or whose influence should be considered. The calculation of the load capacity thus can be effected by using a formula and parameters from the geometry and basic static data or basic tables.

The method of the present disclosure is not restricted to two independent parameters. Rather, any number of parameters can be considered which have an influence on the load capacity. Thus, it can be provided that the load capacity should be determined in dependence on n parameters, with $n \geq 2$, and the method comprising an $n^{th}$ step in which the load capacity is determined by interpolation or extrapolation or by calculation on the basis of the values of the load capacity determined in the $(n-1)^{th}$ step for different values of the $n^{th}$ parameter. This means that the $n^{th}$ step in the determination of the load capacity employs points of support which were determined in the preceding step, i.e. in the $(n-1)^{th}$ step.

The method can be performed with a small number of points of support. In principle it is sufficient when the interpolation or extrapolation is each performed on the basis of two points of support.

Furthermore, it can be provided that the parameters are entered manually. Alternatively or in addition, the determination of the parameters can be effected on the crane by a sensor. In both cases, a continuous adjustment or detection of the parameters preferably is possible. The detection of a parameter by a sensor is expedient in particular when the value has a fixed magnitude (e.g. ballast plate identification) or can be rounded to a fixed magnitude (discretization). The detection of parameters by a sensor is considered for instance in the case of the parameters rotary platform ballast and/or central ballast. Any other parameters, such as the wind speed, can of course also be detected by a sensor.

The parameters included in the calculation of the load capacity preferably are the set-up or condition parameters of the crane.

The parameters which have an influence on the load capacity can be selected from the following non-final group: rotary platform ballast, central ballast (additional undercarriage weight), supporting geometry, wind speed, longitudinal and lateral inclination of the crane, travel speed (in tables on tires or crawler), derrick radius, derrick ballast, angle of rotation of rotary platform, longitudinal and transverse angle of the boom bracing trestle (TA, TY). As regards the supporting geometry, "retracted", "reduced", "broad", 10% steps or finer steps of the sliding beam length can be adjusted instead of firmly specified steps.

When the parameter detected by a sensor varies considerably, as this can for instance be the case with the wind speed, or changes without the action of the crane operator, such as the lateral inclination, the sensor value can be used to preferably permanently switch the load capacity calculation when a parameter limit is exceeded for the first time, such that another, possibly lower parameter value is calculated for the measured sensor value. In this way it is possible to determine a small load capacity which hence is safe in operation.

The present disclosure finally relates to a crane with a unit which includes means for performing one or more of the various methods of the present disclosure. The crane for instance is a derrick crane or a mobile crane, but other types of cranes are also included by the present disclosure.

BRIEF DESCRIPTION OF THE FIGURES

FIG. 1 shows a high level flow chart of example operation.

DETAILED DESCRIPTION

Further details of the present disclosure will now be explained in detail with reference to an embodiment described below.

The calculation of the load capacity is effected for arbitrary freely selectable values of a parameter within a range of parameters. The value of a parameter can for instance be entered on a monitor by a numerical keyboard. Alternatively, it is conceivable to select the parameter value from a number of finely graduated, specified values by dial-up or by a "<" or ">" key and by actuating an Enter key.

In a first example, the parameter values for a derrick crane with luffing jib without derrick ballast are a main boom angle of 83° and an outreach of 21.7 m. The dependence of the admissible load capacity on the outreach for the main boom angles of 77° and 87° is known. In a first step, there is first determined the load capacity value for an outreach of 21.7 m by interpolation between the known points of support at 20 m and at 22 m, both with the main boom angle of 77° and with the main boom angle of 87°. In a second step, the load capacity value for the main boom angle of 83° is determined by interpolation of the load capacity values obtained for both main boom angles of 77° and 87°. Thus, two interpolations of the load capacity are performed in dependence on the outreach, and one interpolation of the load capacity in dependence on the main boom angle.

It also applies for this example that the points of support of the outreach likewise can be chosen differently for the different main boom angles.

In a second example, the parameter values for a derrick crane without luffing jib with derrick ballast include a derrick ballast radius of 14.5 m and an outreach of 21.7 m. The dependence of the admissible load capacity on the outreach is known for derrick ballast radii of 13 m and 15 m. In a first step, there is first determined the load capacity value for the outreach of 21.7 m by interpolation between the known points of support at 20 m and at 22 m, both with the derrick ballast radius of 13 m and with the derrick ballast radius of 15 m. In a second step, the load capacity value for the derrick ballast radius of 14.5 m is likewise determined by interpolation of the load capacity values obtained for both derrick ballast radii of 13 m and 15 m. The method of the present disclosure is not restricted to the determination of the load capacity in dependence on two parameters. Any number of parameters can be used. In a third example, the parameter values for a derrick crane with luffing jib and derrick ballast include an outreach of 21.7 m, a derrick ballast radius of 14.5 m and a main boom angle of 83°.

The dependence of the admissible load capacity on the outreach is known for derrick ballast radii of 13 m and 15 m, each for the main boom angles of 77° and 87°.

In a first step, the load capacity value for the outreach of 21.7 m is determined by interpolation between the known points of support at 20 m and 22 m, both with the derrick ballast radius of 13 m and with the derrick ballast radius of 15 m and separately for both main boom angles. In principle, it is likewise conceivable to differently choose the points of support for the outreach for different main boom angles. On the whole, four interpolations of the load capacity are thus performed in the first step in dependence on the outreach. The values determined for derrick ballast radii of 13 m and 15 m are interpolated with respect to the value of 14.5 m. This interpolation is effected for both main boom angles (77° and 87°). Thus, two interpolations of the load capacity are effected for different values of the derrick ballast radius. These interpolations result in two load capacity values for the main boom angles of 77° and 87°. Finally, an interpolation is effected on the basis of these points of support for the main boom angle of 83°.

A corresponding example can be provided for the parameters outreach, derrick ballast radius and derrick ballast (e.g. 255 t). In this case, four interpolations are again obtained via the outreach, two interpolations via the derrick ballast radius as well as one interpolation via the derrick ballast (points of support e.g. at 200 t and 300 t).

The sequence of the interpolations can of course be chosen as desired and can be changed to differ from the above-mentioned examples.

In the example given below, the load capacity is determined in dependence on four parameters. These are the parameters of outreach (21.7 m), main boom angle (83°), derrick ballast radius (14.5 m) and derrick ballast (255 t). The load capacities in dependence on the outreach are known for two different derrick ballast radii, namely with the parameter values of a derrick ballast of 200 t and 300 t and with the main boom angles of 77° and 87°.

First of all, the load capacity with an outreach of 21.7 m and with derrick ballast radii of 13 m and 15 m is determined between the points of support of the outreach of 20 m and 22 m. This determination is effected for the four pairs of values of the derrick ballast and the main boom angle of 300 t, 77°; 300 t, 87°; 200 t, 77° and 200 t, 87°. On the whole, eight interpolations of the load capacity are thus performed in dependence on the outreach with two points of support each. On the basis of two load capacity values each determined in this way, four interpolations are performed for the value of the derrick ballast radius of 13.7 m.

The load capacity values determined for the four pairs of values mentioned above are supplied to further interpolation steps, two interpolations being performed each for different main boom angles and for identical derrick ballast radii. The result of this interpolation includes two load capacity values for different derrick ballast values.

The last interpolation is effected with regard to the determination of the load capacity value for different derrick ballast values at 200 t and 300 t, in order to thus obtain the admissible load capacity value with a derrick ballast of 255 t.

For this example it is also applicable that the points of support for the outreach can also be chosen differently depending on the main boom angle.

The invention claimed is:

1. A method for determining the admissible load capacity of a crane, in which the load capacity is determined in dependence on at least one first and one second parameter, the method comprising:

a first step in which the load capacity is determined for a value of the first parameter with different values of the second parameter by calculation or by interpolation or extrapolation on the basis of known values of the load capacity with specific values of the first parameter; and a second step in which a determination of the load capacity for a value of the second parameter is performed on the basis of values of the load capacity determined in the first step for different values of the second parameter by calculation or by interpolation or extrapolation, wherein the first and second parameters are parameters which influence the admissible load capacity of the crane, wherein the first and second steps are performed by a unit of the crane to determine the admissible load capacity of the crane, and wherein the admissible load capacity of the crane is a load capacity that is safe in operation, wherein the parameter values are detected by a sensor, and when a parameter value exceeds a limit, another parameter value which provides a lower load capacity is used in determining the admissible load capacity, instead of the parameter value detected by the sensor.

2. The method as claimed in claim 1, wherein the specific values of the first parameter, at which the values of the load capacity are known, are chosen in dependence on the values of the second parameter.

3. A method for determining the admissible load capacity of a crane, comprising:

determining the load capacity in dependence on at least one first and one second parameter and where the determination of the load capacity is performed by calculation by a connection described by formulae between the load capacity and the parameters, wherein the first and second parameters are parameters which influence the admissible load capacity of the crane, wherein the determination of the load capacity is performed by a unit of the crane, wherein the admissible load capacity of the crane is a load capacity that is safe in operation, wherein values of the parameters are detected by a sensor, and when a parameter value exceeds a limit, another parameter value which provides a lower load capacity is used in determining the admissible load capacity, instead of the parameter value detected by the sensor.

4. The method as claimed in claim 1, wherein the load capacity is determined in dependence on n parameters, with n≥2.

5. The method as claimed in claim 4, wherein the method comprises an $n^{th}$ step, in which the determination of the load capacity for the $n^{th}$ parameter is performed on the basis of the values of the load capacity determined in an $(n-1)^{th}$ step for different values of the $n^{th}$ parameter by calculation or by interpolation or extrapolation.

6. The method as claimed in claim 1, wherein the interpolation or extrapolation is performed on the basis of two points of support.

7. The method as claimed in claim 1, wherein the values of other parameters are entered manually and are then taken as a basis for the determination of the load capacity.

8. The method as claimed in claim 1, wherein parameters which have a specific value, or which have values that can be rounded to a specific value, are detected by a sensor.

9. The method as claimed in claim 1, wherein the values of the parameters rotary platform ballast and/or central ballast are detected by means of a sensor.

10. The method as claimed in claim 1, wherein the parameters are set-up and/or condition parameters of the crane.

11. The method as claimed in claim 1, wherein the parameters include at least one of rotary platform ballast, central ballast, supporting geometry, wind speed, longitudinal and lateral inclination of the crane, travel speed, derrick radius, derrick ballast, angle of rotation of a rotary platform, longitudinal and transverse angle of a boom bracing trestle.

12. A method for determining the admissible load capacity of a crane at a given value of a first parameter and a given value of a second parameter, wherein the load capacity is dependent upon said first and second parameters, and the load capacity is known for at least two values of the first parameter and at least two values of the second parameter, the method comprising:

determining at least a first and second load capacity of the crane at the given value of the first parameter by calculation or by interpolation or extrapolation on the basis of the known values of the load capacity at the first and second values of the second parameter and the first and second values of the first parameter; and determining a third load capacity of the crane at the given value of the second parameter and the given value of the first parameter by calculation or by interpolation or extrapolation on the basis of the first and second load capacities at the given value of the first parameter and the first and second values of the second parameter, wherein said determination of the first, second, and third load capacities is performed by a unit of the crane to determine the admissible load capacity of the crane, and wherein the given values of the first and second parameters are detected by a sensor, and when a given parameter value exceeds a limit, another parameter value which provides a lower load capacity is used in determining the admissible load capacity, instead of the given parameter value detected by the sensor.

13. The method of claim 12, wherein said given values of the first and second parameters are arbitrary parameter values within a range.

14. The method of claim 13, wherein at least one of the first and second parameters is a platform ballast, central ballast, or supporting geometry.

15. The method of claim 13, wherein at least one of the first and second parameters is a wind speed, a longitudinal inclination of the crane, a lateral inclination of the crane, or a travel speed.

16. The method of claim 13, wherein at least one of the first and second parameters is a derrick radius or derrick ballast.

17. The method of claim 13, wherein at least one of the first and second parameters is an angle of rotation of a rotary platform, a longitudinal angle of a boom bracing trestle, or a transverse angle of a boom bracing trestle.

* * * * *